Oct. 27, 1942.  W. LARKIN  2,300,260
AUTOMOBILE SIGNAL
Filed April 30, 1940   2 Sheets-Sheet 1
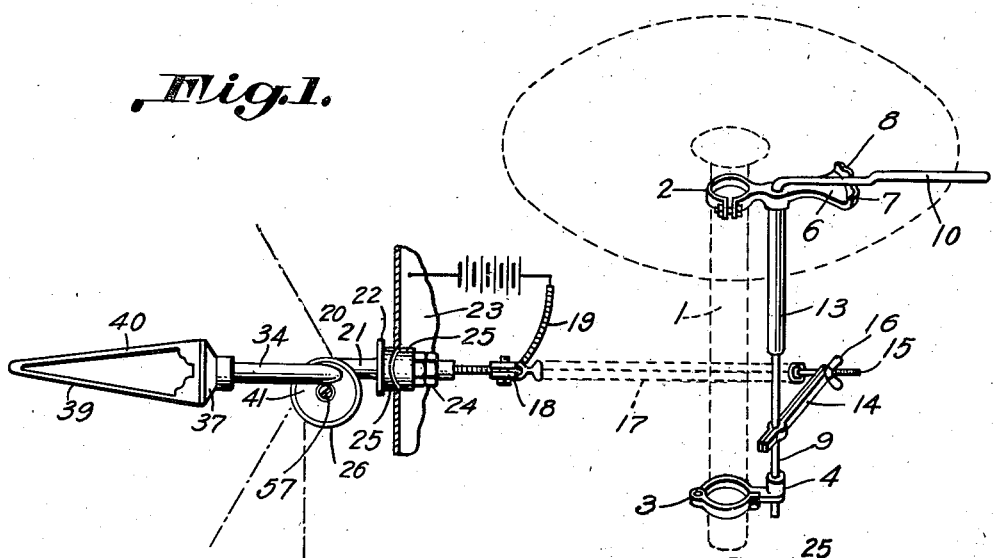
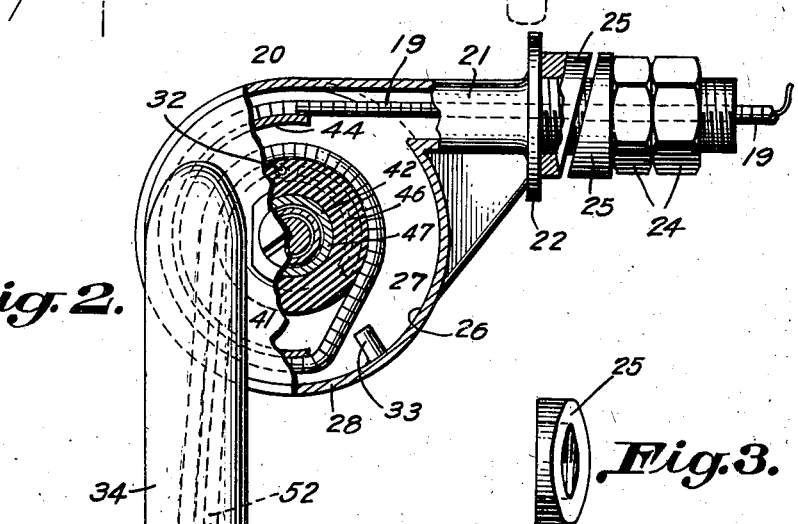
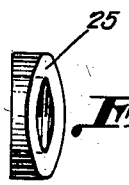
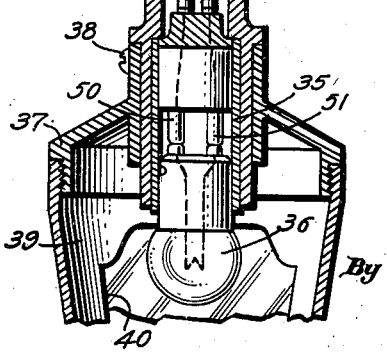
Inventor.
William Larkin
Attorney.

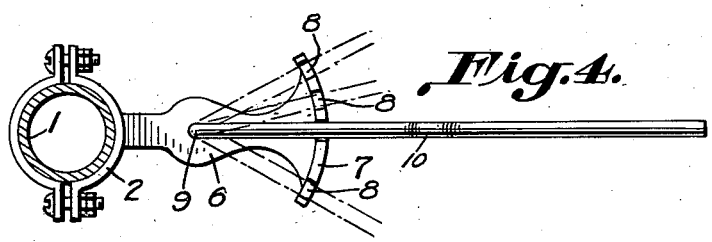
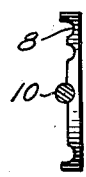
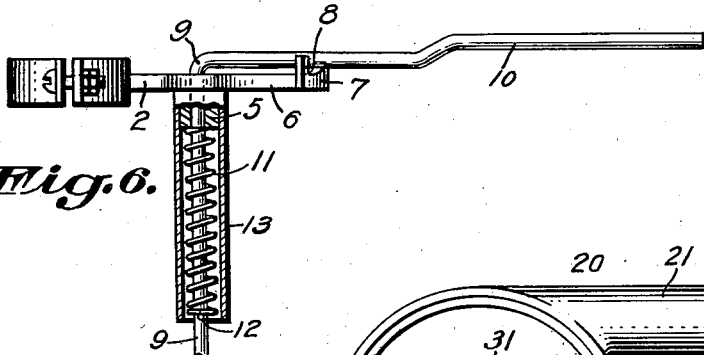
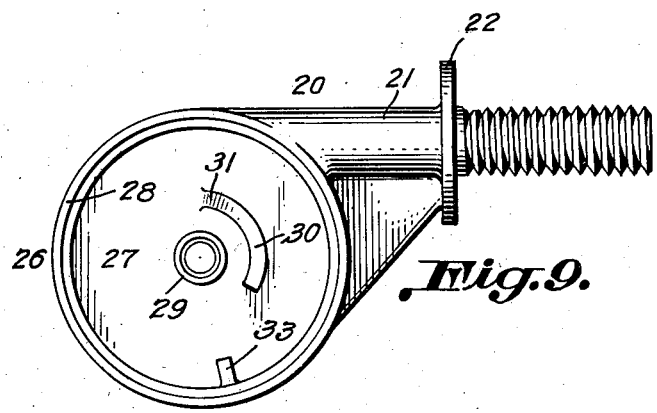
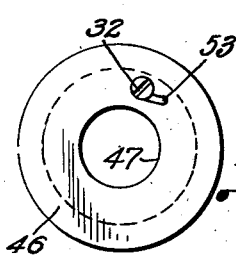
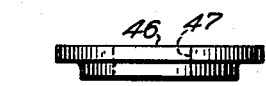
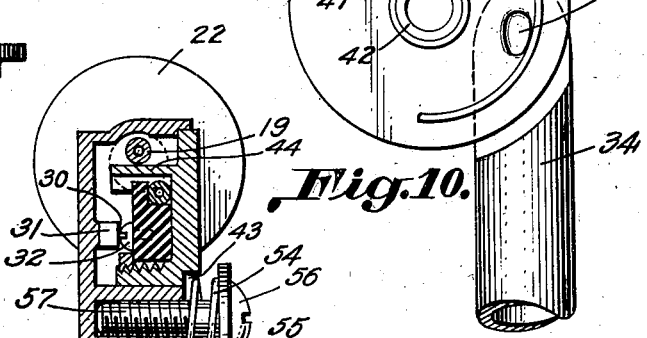
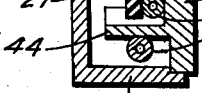

Patented Oct. 27, 1942

2,300,260

UNITED STATES PATENT OFFICE 2,300,260

AUTOMOBILE SIGNAL

William Larkin, Tacoma, Wash., assignor to Theodore O. Storaasli, Tacoma, Wash.

Application April 30, 1940, Serial No. 332,539

2 Claims. (Cl. 177—327)

This invention relates to signals for indicating the direction of a proposed turn for motor vehicles and especially for closed passenger automobiles.

Several different forms for signals for motor vehicles have been invented and the most generally accepted ideal is to provide a movable signal arm mounted on the vehicle at a point approximately the level of the driver's elbow if he were making the signals with his hand, said signal arm being adapted to be swung from its inoperative vertically downward position outward away from the car into the three accepted positions of pointing downward at an angle of about 45° for slow or stop; pointing horizontally for left turn; and pointing upward at an angle of about 45° for a right turn. Also it is a generally accepted ideal that the said signal arm should be operated from the inside of the car as conveniently as possible.

The following described apparatus fulfills these ideals. The objects of my invention are to provide such an apparatus of extreme simplicity of construction without sacrificing any of its desired functions, thereby permitting the device to be marketed at a low price and also eliminating many causes of failure in more complicated structures; another object is to provide means for fastening the device to the side of the automobile in such manner that it will extend directly outward therefrom independently of the angle of the surface to which it is attached; another object is to provide a simplified form of switch for the signal light, and to provide a flexible connection between the fixed and the movable parts of the signal.

I attain these and other objects by the devices, mechanisms and arrangements illustrated in the accompanying drawings, in which—

Fig. 1 is a partial rear elevation of my improved signal, showing the steering post and wheel of the car in dotted lines, and illustrating the method of operating the signal; Fig. 2 is a rear elevation of a portion thereof, showing parts thereof in section; Fig. 3 is an elevation of a skew washer used in securing the device to the car; Fig. 4 is a plan view of the operating arm; Fig. 5 is an end view of the quadrant on which the arm slides; Fig. 6 is a side elevation of the operating arm, showing the spring protecting tube in section; Figs. 7 and 8 are plan and elevation, respectively, of the insulating disk of the switch; Fig. 9 is an elevation of the fixed bracket disassociated from the moving arm; Fig. 10 is an elevation of a part of the signal arm disassociated from the fixed bracket and turned to view the inner side of the joint disk; and Fig. 11 is a section of the arm joint assembled on the fixed bracket.

Similar numerals of reference refer to similar parts throughout the several views.

Referring first to Figs. 1, 4–6 illustrating the means of operating the signal, it will be seen that the steering post 1 of the car is provided with an upper bracket 2, clamped or otherwise secured thereto, and with a lower bracket 3 similarly secured thereto. The lower bracket 3 has a boss 4 through which a hole having its axis parallel to the post 1, passes. The upper bracket 2 also has a similar boss 5, corresponding in position with the boss 4, and a quadrant 6, concentric with the hole in the boss 5. The quadrant 6 has an upturned edge 7 provided with notches 8 therein adapted to hold the operating arm or handle in any one of four positions about the hole in the boss 5. The operating arm comprises a rod 9 which extends along the side of the post 1 through the holes in the brackets 3 and 2 and is then bent outward above the upper bracket 2 and under the steering wheel, to form the handle 10. A spring 11 engages the lower side of the upper boss 5 and a pin 12 in the vertical part of the rod 9, and draws the handle 10 down to resiliently engage the notches 8 of the quadrant 6. A protective spring casing is formed by the tube 13 which is secured around the boss 5 and extends downward therefrom to surround the said spring 11. The lower end of the rod 9 is provided with a lever arm 14, having a horizontal hole through its outer end. A bolt 15 passes freely through said hole in the lever 14 and is provided with a winged nut 16 engaging the said lever to adjust the tension of the connection between the lever and the signal arm. This connection comprises a chain or other suitable attachment 17, secured to the bolt 15 and extending to a suitable clamp 18 adjustably clamped to the armored cable 19 of the signal arm, hereinafter described.

Referring, now, to the signal arm apparatus illustrated in Figs. 1–3, 7–11. The fixed bracket 20 (Figs. 2 and 9) comprises a hollow stem 21 having a flange 22 intermediate its ends and extending around it. If the surface of the side 23 of the car, at the point to which the apparatus is attached, is vertical and parallel with the central longitudinal axis of the car, then the flange 22 may be brought up thereagainst and the inner portion of the stem, which is screw-threaded, may have the nuts 24 screwed thereon against the inner side of the side 23 of the car but, if the said side 23 is not parallel to the central plane of the car then a pair of similar skew washers 25

(Figs. 2 and 3) of suitable shape may be interposed, one on each side of the side 23, between the flange 22 and the nuts 24, thus causing the axis of the signal to extend straight out from the car.

The stem 21 leads tangentially to the rim of a fixed cup 26, comprising a circular plate 27 having a cylindrical rim 28, a central screw-threaded boss 29, and an arcuate low flange 30, which is connected at its end with the plate 27 by a short inclined portion 31 and which is adapted to form the ground switch for the light, when engaged by the head 32 of the screw, as hereinafter described. A stop 33 may also be formed within the rim 28 and is adapted to be engaged by a portion of the signal when in its raised position, to prevent excessive motion thereof.

The signal arm (Figs. 1, 2 and 10) comprises a short straight hollow arm 34, having a lamp socket 35 mounted in its outer end, said socket 35 mounting a suitable electric lamp 36. A skirt 37 surrounds the lamp socket 35 and is attached to the end of the arm 34 by a set screw 38. The skirt 37 is provided with a conically shaped signal pointer 39, having its front and rear surfaces partially cut away to form openings 40 in which orange or other colored translucent material is mounted. Since the pointer 39 is conical in shape it is evident that the signal may be seen from any point on that side of the car and in any position of the signal arm.

The inner end of the arm 34 (Fig. 10) extends tangentially from the outer side of the closure plate 41 of the signal joint. This closure plate 41 fits snugly in a groove in the edge of the rim 28 of the fixed cup 26 (Fig. 11). The plate 41 is provided with an externally screw-threaded central boss 42 having a central hole, concentric with the edge of the plate 41, and fitting over the central boss 29 of the fixed cup 26. A central recess 43 in the outer face of the plate 41 surrounds the said central hole and provides a cavity for the end of the hereinafter described spring which holds the plate 41 against the cup 26. A flange 44 extends inward from the inner face of the plate 41, said flange being substantially semicircular in plan and spaced from the edge. The interior of the short arm 34 communicates with the interior of the joint by means of a hole 45 in the plate 41, through which the operating cable 19 and the ground wire from the electric lamp 36 pass.

A circular clamping disk 46 (Figs. 7 and 8) made of suitable insulating material, is provided with a central hole 47 which fits over the screw-threaded boss 42, but which is thinner than the length of said boss. A knurled nut 48 screws on the end of the boss 42 and clamps the disk 46 firmly onto the plate 41. The under edge of the disk 46 is grooved, as at 49, to receive and clamp the armored cable 19 between it and the plate 41. The armored cable 19 includes an electric wire suitably connected to the battery or other suitable circuit of the car, which leads from such source of electric energy through the stem 21 of the fixed bracket, thence onto the outer side of the semicircular flange 44 of the plate 41, thence into the groove 49 of the disk 46 in which it is clamped, and thence to one of the terminals 50 of the lamp socket 35, whereby the lamp 36 is connected to said battery; the other terminal 51 is connected by the ground wire 52 through the arm 34, the hole 45, and through a hole 53 in the insulating disk 46 to the terminal screw 32 mounted in the said disk 46. The head of said screw 32 is positioned so that when the arm 34 is in its initial vertical position, said screw head does not come in contact with any metal part of the signal joint but, as soon as the arm is swung outward, the said screw head engages first the inclined part 31 of the flange 30, and then rides on top of the said flange 30, thereby completing the electric circuit through the lamp 36 and energizing it. Since the flange 30 and the screw-head 32 and the insulating disk 46 are inflexible, it follows that as the head 32 slides up the incline 31 to the top of the flange 30, the closure plate 41 must slide slightly axially. This motion is accommodated in my mechanism by providing a spring 54 resting in the recess or groove 43 and engaging a washer 55 on the underside of the head 56 of the screw 57. As seen particularly in Fig. 11, the screw 57 is tightly screwed into the threaded hole in the central boss 29 of the fixed cup 26. This spring 54 therefore continuously but flexibly presses the plate 41 into the cup 26 and the screw head 32 against the surfaces 31 and 30. The disk 46 therefore acts not only as a clamp for the cable 19 but also as a carrier for the switch contact screw 32.

Thus it will be seen that when the handle 10 is moved from its idle position, it moves the lever arm 14 and pulls the chain 17, clamp 18 and armored cable 19, to turn the plate 41 and swing the arm 34 outward, simultaneously bringing the screw 32 into contact with the flange 31, 30 to complete the electric circuit through the lamp 36 to illuminate the pointer 39 through the translucent material in the holes 40 thereof.

It will also be understood that the notches 8 are of sufficient depth, and the spring 11 sufficiently strong, to hold the handle 10 in whatever position it may be placed in, and that as soon as the handle 10 is released from such position, the weight of the signal arm will return all the parts to the neutral or inactive position.

Having described my invention, what I claim and desire to secure by Letters Patent is:

1. In an automobile signal, in combination a fixed bracket mounted on the automobile and extending outward therefrom and provided with a cylindrical cup, having a horizontal axis, tangentially formed on said fixed bracket, together with an arcuate ground flange formed in said cup and having a closure plate mounted concentrically on said cup and adapted to rotate thereon and to move axially thereon, an arcuate cable guide flange mounted on said closure plate and in said cut, a spring mounted on said fixed cup and engaging said closure plate to resist the axial motion thereof, a signal arm extending tangentially from said closure plate, a translucent pointer mounted on the end of said signal arm, an electric lamp mounted on said signal arm and within said pointer, an electric conductor comprising an armored cable connected to said lamp, a ground wire connected to said lamp, both said armored cable and ground wire passing from said lamp in said signal arm to the interior of said fixed cup, an insulating disk mounted on said closure plate and in said cup, the periphery of said disk clamping said armored cable between it and said closure plate, said cable passing thence to said arcuate guide flange and thence through said bracket into the automobile and thence to a grounded source of electric energy, said ground wire passing from said arm to a terminal mounted on said disk and adapted to engage said arcuate ground flange within said cup to ground said lamp and complete the electric circuit, and operating means engaging said armored cable to pull it and thereby to cause the signal arm and pointer to swing outward from the car, and simultaneously to ground the lamp and cause it to illumine said pointer.

2. In an automobile signal, the combination of a fixed cylindrical cup, supported outside of the automobile and having its axis horizontal, an internally-threaded central boss in said cup, an arcuate ground flange in said cup, a closure plate mounted on the open end of said cup, an arm mounted on said plate, an arcuate cable guide flange mounted on the inner side of said plate, an externally-threaded central boss on said plate and fitting over said central internally-threaded boss of said cup, a screw extending from the central boss of said cup, outside of said plate, a spring mounted on said screw and pressing against said plate to resist axial motion of the plate in the cup, an insulating disk mounted outside of said boss on said plate and clamped thereon by a nut screwed on said boss, a ground terminal mounted on said insulating disk and adapted to engage said arcuate ground flange in said cup, an electric lamp at the free end of the arm, an electric cable connected to a grounded source of electric energy and passing through said cup and wound around said arcuate cable flange and said insulating disk to said electric lamp, an insulated electric wire connected to said electric lamp and to said ground terminal, and means to actuate said cable to rotate the insulating disk, whereby the ground terminal is brought into contact with said arcuate ground flange to complete the electric circuit and to illumine said lamp.

WILLIAM LARKIN.